(12) United States Patent
Taner (10) Patent No.: US 6,487,502 B1
(45) Date of Patent: Nov. 26, 2002

(54) SYSTEM FOR ESTIMATING THE LOCATIONS OF SHALEY SUBSURFACE FORMATIONS

(75) Inventor: M. Turhan Taner, Houston, TX (US)

(73) Assignee: RDSP I, L.P., Houston, TX (US)

( * ) Notice: Subject to any disclaimer, the term of this patent is extended or adjusted under 35 U.S.C. 154(b) by 91 days.

(21) Appl. No.: 09/728,037

(22) Filed: Dec. 1, 2000

(51) Int. Cl.$^7$ ................................................ G01V 1/28
(52) U.S. Cl. ....................................................... 702/14
(58) Field of Search .......................... 702/14, 16, 18; 367/72, 73

(56) References Cited

U.S. PATENT DOCUMENTS

| | | |
|---|---|---|
| 3,899,768 A | 8/1975 | Quay et al. |
| 4,633,447 A | 12/1986 | Bodine |
| 4,779,237 A | 10/1988 | Bodine |
| 5,001,677 A | 3/1991 | Masters |
| 5,226,019 A | 7/1993 | Bahorich |
| 5,563,949 A | 10/1996 | Bahorich et al. |
| 5,724,309 A | 3/1998 | Higgs et al. |
| 5,808,966 A | 9/1998 | Calvert et al. |
| 5,838,564 A | 11/1998 | Bahorich et al. |
| 5,850,622 A | 12/1998 | Vassiliou et al. |
| 5,870,691 A | 2/1999 | Partyka et al. |
| 5,884,229 A | 3/1999 | Matteucci |
| 5,892,732 A | 4/1999 | Gersztenkorn |
| 5,930,730 A | 7/1999 | Marfurt et al. |
| 5,940,778 A | 8/1999 | Marfurt et al. |
| 6,012,018 A | 1/2000 | Hornbuckle |
| 6,092,025 A | 7/2000 | Neff |

OTHER PUBLICATIONS

Barnes, Arthur E.; Theory of two–dimensional complex seismic trace analysis; 64$^{th}$ Annual International Meeting: Society of Exploration Geophysics, Expanded Abstracts; 1994; pp. 950–951.

Hardage, B.A. and Carr, D.L. and Lancaster, D.E. and Simmons, J.L. and Hamilton, D.S. and Elphic, R.Y. and Oliver, K.L. and Johns, R.A.; 3–D Seismic imaging and seismic attribute analysis of genetic sequences deposited in low–accommodation conditions: Geophysics; Sep.–Oct. 1996; pp. 1351–1362; vol. 61, No. 5.

Haskell, N.L. and Nissen, S.E. and Lopez, J.A. and Bahorich, M.S.; 3–D Seismic coherency and the imaging of sedimentological features; 65$^{th}$ Annual International Meeting: Society of Exploration Geophysics, Expanded Abstracts; 1995; pp. 1532–1534.

Lefeuvre, F.E. and Wrolstad, K.H. and Zou, K.S. and Smith, L.J. and Maret, J–P. and Nyein, U.K.; Sand–shale ratio and sandy reservoir properties estimation from seismic attributes: An integrated study; 65$^{th}$ Annual International Meeting: Society of Exploration Geophysics, Expanded Abstracts; 1995; pp. 108–110.

(List continued on next page.)

Primary Examiner—Donald E. McElheny, Jr.
(74) Attorney, Agent, or Firm—E. Eugene Thigpen (57) ABSTRACT

The invention in a first embodiment comprises a method of utilizing seismic data attributes for interpreting seismic data from a region of the earth's subsurface, in which values are calculated for a plurality of seismic data attributes of said seismic data, and combinations of said calculated values are generated to develop an indication of shaliness of said region of the earth's subsurface. In another embodiment the invention comprises a device, which is readable by a digital computer, having instructions thereon for defining a process and instructing a computer to perform a process for calculating values for seismic data attributes of said seismic data indicative of thinness of subsurface strata, parallelism of subsurface strata, lateral continuity of subsurface strata and continuity consistency of subsurface strata, and generating combinations of calculated values for said seismic data attributes to generate an indication of shaliness of said region of the earth's subsurface.

13 Claims, 4 Drawing Sheets

OTHER PUBLICATIONS

Lefeuvre, F.E. and Chanet, A.; Reservoir characterization: A seismic attributes approach; 63$^{rd}$ Annual International Meeting: Society of Exploration Geophysics, Expanded Abstracts; 1993; pp. 289–293.

Neidell, N.S. and Taner, M. Turhan; semblance and Other Coherency Measures for Multichannel Data; Geophysics; Jun. 1971; pp. 482–497; vol. 36; No. 3.

Robertson, James D. and Nogami, Henry H.; Complex seismic trace analysis of thin beds; Geophysics; Apr. 1984; pp. 344–352; vol. 49; No. 4.

Sonneland, Lars and Barkved, OlaV and Olsen, Morten and Snyder, Gary; Application of Seismic Wave Field Attributes in Reservoir Characterization; 59$^{th}$ Annual International Meeting: Society of Exploration Geophysics; 1989; pp. 813–817.

Taner, M. Turhan and Schuelke, James S. and O'Doherty, Ronen and Edip, Baysal; Seismic Attributes Revisited; 64$^{th}$ Annual International Meeting: Society of Exploration Geophysics; 1994; pp. 1104–1106.

Vossier, Donald A.; Automatic Delineation of Lateral Facies Changes in Clastic Environments; 59$^{th}$ Annual International Meeting: Society of Exploration Geophysics, Expanded Abstracts; 1989; pp. 803–804.

White, Roy E.; Properties of instantaneous seismic attributes; Geophysics: The Leading Edge of Exploration; Jul. 1991; pp. 26–32.

Steeghs, T.P.H. and Drijkoningen, G.G. and Peet, W.E. and Fokkema, J.T.; A new method for the extraction of seismic facies attributes; Eage: 57$^{th}$ Meeting: European Association of Exploration Geophysics, Extended Abstracts; May 29–Jun. 2, 1995; Session A029; Glasgow, Scotland.

Taner, M.T. and Koehler, F. and Sheriff, R.E.; Complex seismic trace analysis; Geophysics; Jun. 1979; pp. 1041–1063; vol. 44; No. 6.

Jones, Graeme and Boashash, Boualem; Instantaneous frequency, instantaneous bandwidth and the analysis of multicomponent signals; Proceedings of the IEEE; 1990; pp. 2467–2470.

SYSTEM FOR ESTIMATING THE LOCATIONS OF SHALEY SUBSURFACE FORMATIONS

BACKGROUND OF THE INVENTION

1. Field of the Invention

This invention is related to the general subject of seismic exploration and, in particular, to the interpretation of seismic data.

2. Description of Related Art

For many years seismic exploration for oil and gas has been conducted by use of a source to generate seismic energy and the reception of the energy generated by the source by an array of seismic detectors. On land, the source of seismic energy may be a high explosive charge or another energy source having the capacity to deliver a series of impacts or mechanical vibrations to the earth's surface. Acoustic waves generated by these sources travel downwardly into the earth's subsurface and are reflected back from strata boundaries and reach the surface of the earth at varying intervals of time, depending on the distance traveled and the characteristics of the subsurface traversed. These returning waves are detected by the sensors, which function to transduce such acoustic waves into representative electrical signals. The detected signals are recorded for later processing using digital computers. Typically, an array of sensors is laid out along a line to form a series of detection locations. More recently, seismic surveys have been conducted with sensors and sources laid out in generally rectangular grids covering an area of interest, rather than along a single line, to enable construction of three dimensional views of subsurface reflector positions over wide areas. Normally, signals from sensors located at varying distances from the source position are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

Initially, seismic traces were used simply for ascertaining formation structure from displays of seismic data. However, in 1979, Taner et al. published the work *Complex Seismic Trace Analysis*, Geophysics, Volume 44, pp. 1041–1063 (1979), and exploration geophysicists have subsequently developed a plurality of time-series transformations of seismic traces to obtain a variety of characteristics that describe the traces, which are generally referred to as "attributes". Attributes may be computed prestack or poststack. Poststack attributes include reflection intensity, instantaneous frequency, reflection heterogeneity, acoustic impedance, velocity, dip, depth and azimuth. Prestack attributes include moveout parameters such as amplitude-versus-offset (AVO), and interval and average velocities. Further, attributes may be categorized as either instantaneous attributes, wavelet attributes or geometrical attributes. Instantaneous attributes are attributes whose values are obtained for each data point in the seismic data or within a small time window of data points (e.g., a few milliseconds), such as amplitude, phase, frequency and power. Wavelet attributes are the instantaneous attributes computed at the maximum point of the envelope and the physical meaning of all the wavelet attributes is essentially the same as their instantaneous counterparts. Geometrical, or interval, attributes are attributes of a seismic trace within a seismic interval which are computed from the reflection configuration and continuity.

In U.S. Pat. No. 5,226,019, which issued on Jul. 6, 1993, to Michael S. Bahorich, it is stated in column 3 that with reference to seismic attributes "combining multiple (i.e. two or more descriptors through addition, subtraction, multiplication and ratio, or other means can also be successfully employed", and suggests use of "a product of the average instantaneous amplitude and average instantaneous frequency".

U.S. Pat. No. 5,884,229, which issued on Mar. 16, 1999, to Gianni Matteucci, discloses a statistical method for quantitatively measuring the lateral continuity of the seismic reflection character of any specified location in a subsurface target formation.

U.S. Pat. No. 5,930,730, which issued on Jul. 27, 1999, to Marfurt et al., discloses a system for forming a seismic attribute display from calculated measures of semblance and corresponding estimates of true dip and true dip azimuth of seismic traces within an analysis cell.

U.S. Pat. No. 6,012, 018, which issued on Jan. 4, 2000, to William I. Hornbuckle, relates to a system for identifying volumetric subterranean regions bounded by a surface in which a specific seismic characteristic has a constant value. It is stated at column 3, line 36 that, "in a geological region where physical characteristics (e.g., the presence of oil or gas) are well-correlated with seismic attributes, (e.g., seismic amplitude data), the identification of a subvolume bounded by a constant-seismic-attribute-value surface may provide a very useful predictor of the volumetric extent of the attribute and hence of the characteristic."

U.S. Pat. No. 5,001,677, which issued on Mar. 19, 1991, to A. Ronald Masters, discloses a system which treats measured attributes derived from seismic data as components of a vector, estimates a background vector representing typical background geologic strata, and then calculates a new attribute. As stated on col. 8, line 11, the preferred embodiment combines information about P and S impedance contrasts so as to discriminate prospective reservoir strata from surrounding non-reservoir or background strata.

U.S. Pat. No. 5,724,309, which issued on Mar. 3, 1998, to Higgs et al, discloses a system in which two new seismic attributes (dip magnitude and dip azimuth) are derived from instantaneous phase. The system comprises determining a spatial frequency value by taking the directional spatial derivative of the instantaneous phase for each of a plurality of x,y,t(z) data points in the seismic data and posting the spatial frequency values to identify changes within the earth's subsurface.

U.S. Pat. No. 5,870,691, which issued on Feb. 9, 1999, to Partyka et al., discloses a method for processing seismic data to identify thin beds.

Although it is generally recognized that specific seismic attributes are related to specific subsurface properties, a need continues to exist for advancements in the use of seismic attributes to improve the delineation of subsurface regions of the earth to assist in the exploration and production of oil, natural gas and other minerals.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

The invention in a first embodiment comprises a method of utilizing seismic data attributes for interpreting seismic data from a region of the earth's subsurface, in which values are calculated for a plurality of seismic data attributes of said seismic data, and combinations of said calculated values are generated to develop an indication of shaliness of said region of the earth's subsurface.

In another embodiment the invention comprises a device, which is readable by a digital computer, having instructions thereon for defining a process and instructing a computer to perform a process for calculating values for a seismic data attribute of said seismic data indicative of thinness of subsurface strata, calculating values for a seismic data attribute of said seismic data indicative of parallelism of subsurface strata, calculating values for a seismic data attribute of said seismic data indicative of lateral continuity of subsurface strata, calculating values for a seismic data attribute of said seismic data indicative of continuity consistency of subsurface strata, and generating combinations of calculated values for said plurality of seismic data attributes to generate an indication of shaliness of said region of the earth's subsurface.

DESCRIPTION OF PREFERRED EMBODIMENTS

An important aspect of subsurface structural analysis is to distinguish shaley regions of the subsurface, which are less likely to contain producible hydrocarbons, from sandstones, carbonates and other sedimentary structures which are more likely to contain producible hydrocarbons. Shaley regions of the subsurface are characterized by a plurality of thin strata (or layers), which are substantially parallel to each other, and have lateral continuity and continuity consistency. Accordingly, in accordance with the present invention, seismic attributes are calculated which represent thinness, lateral continuity, continuity consistency and parallelism of subsurface strata.

The first step of the process is to obtain a set of seismic data in the form of seismic signal traces distributed over a three dimensional volume of the earth. Methods by which such data are obtained and reduced to digital form for processing as seismic data are known to those skilled in the art. Typically, data points are generated in a rectangular grid pattern, with one of the directions along which the data points extend being referred to as the in-line direction, and the other, orthogonal, direction being referred to as the cross-line direction. Seismic data are normally stored in data storage media, on which the location from which the data were obtained is identified, to enable appropriate processing of the data.

Calculation of Lateral Continuity

Figure 1:
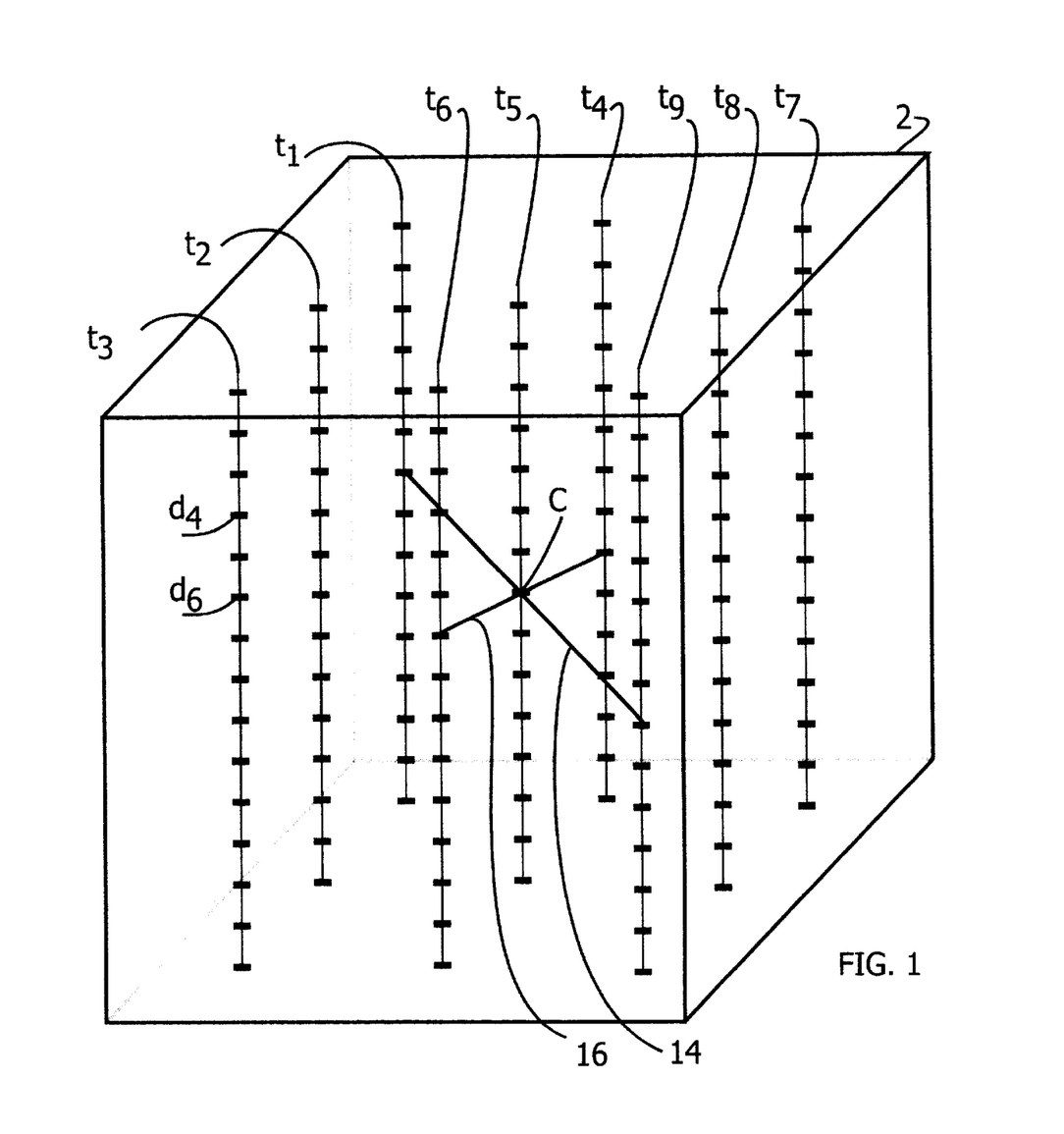
FIG. 1 illustrates the use of an analysis cell for seismic data processing.

Lateral continuity is a measure of bedding similarity in the direction of the bedding dip of a subsurface location. To calculate lateral continuity, an analysis cell (sometimes referred to as a "cube") of data points from selected spatially related seismic signal traces such as shown in FIG. 1, designated with the numeral 2, is utilized. The analysis cell illustrated in FIG. 1 includes 9 traces ($t_1$–$t_9$) in the in-line and cross-line directions, and each trace includes 15 sample points (for example, $d_4$ and $d_6$) in the time direction. Those of ordinary skill in the art will appreciate that various cell sizes may be utilized. However, for purposes of visual clarity, the cell shown in FIG. 1 includes only nine traces. Each cell will normally extend symmetrically from a center sample data point, which is designated in FIG. 1 with the reference designation C.

Figure 2:
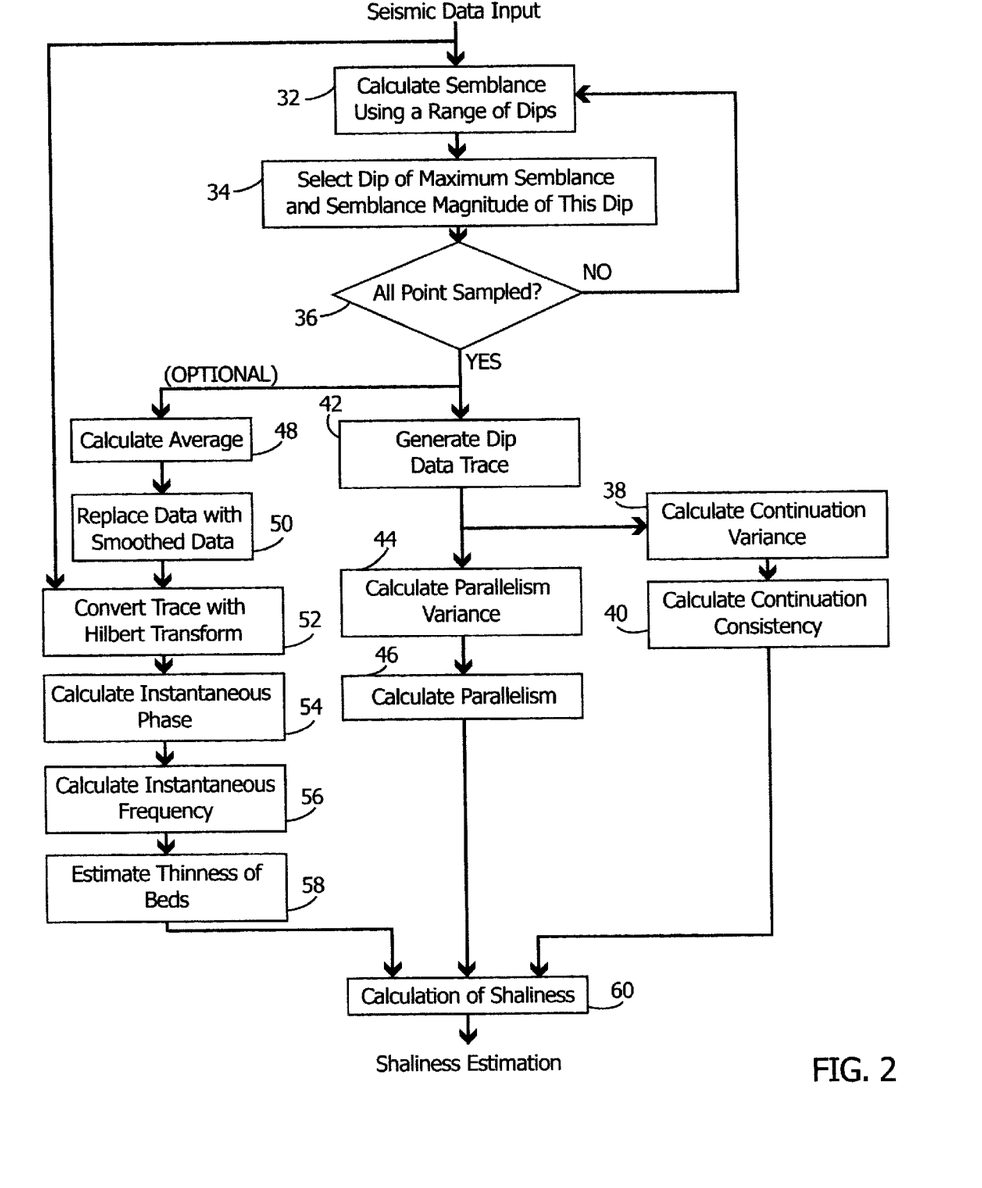
FIG. 2 is a schematic diagram which outlines a preferred implementation of the invention.

With reference to FIG. 2, in step 32, for each cell of selected data points, semblance is calculated along each line of data points, extending from the center data point of the cell within a specified range of dips, which may typically extend ±16 to 20 milliseconds in the time direction from the center data point. Lines 14 and 16 are shown in FIG. 1 by way of illustration. For convenience in calculating semblance, the traces along which semblance is calculated may be time shifted so that semblance is calculated along a constant time line. Accordingly, semblance may be calculated utilizing the following relationship:

$$Semb(t) = \frac{\sum_{\tau=-N/2}^{\tau=N/2} \left\{ \sum_{m=1}^{M} f_m(t+\tau) \right\}^2 - \sum_{\tau=-N/2}^{\tau=N/2} \sum_{m=1}^{M} f_m^2(t+\tau)}{(M-1) \sum_{\tau=-N/2}^{\tau=N/2} \sum_{m=1}^{M} f_m^2(t+\tau)} \quad \text{(Eq. 1)}$$

in which: Semb(t)=the calculated value of semblance

N=the number of samples in the computation window

M=number of traces being scanned $f_m(t+\tau)$=the time shifted data sample in the m'th trace In step 34, the dip of maximum semblance and the corresponding magnitude of semblance of this dip are selected from the calculations performed in step 32. At decision point 36, it is determined whether semblance has been calculated for all data point within the subsurface region of interest. If the answer is "no", the cell shown in FIG. 1 is moved so that a successive data point is at the cell center, and the processes of steps 32 and 34 are repeated. The dip scan processes of steps 32 and 34 are repeated until the dip of maximum semblance and the semblance magnitude of this dip is determined for each trace data sample point within the subsurface region of interest. For each data point the calculated semblance magnitude for the dip of maximum semblance is a measure of lateral continuity (the "Lateral Continuity") for the data sample point.

Calculation of Consistency of Continuity

The term "continuity consistency" is intended to mean the degree to which the semblance magnitude for successive data points of a "dip" data trace are consistent. For each trace data point, the semblance magnitude for the dip direction of maximum semblance has been calculated in steps 32 and 34. A "dip" data trace, may be utilized for calculating continuity consistency. This dip data trace is generated in step 42 for data points extending along a seismic data trace. In the "dip" data trace, each data point in the seismic data trace is replaced with dip direction of maximum semblance and the corresponding value of maximum semblance calculated in steps 32 and 34 for that data point. In order to calculate a value for continuity consistency, a window centered on a selected data point along a "dip" data trace is selected and the variance in the semblance magnitude for the dip direction of maximum semblance (the "continuity variance") is then computed in the window in step 38. The window length may be, for example, 40 milliseconds. The continuity consistency is inversely related to the continuity variance.

Accordingly, the magnitude of continuity consistency may be computed in step 40 for each data point of a seismic trace from the following relationship $$ContinuityConsistency(x,y,t)=1-ContinuityVariance(x,y,t) \quad \text{(Eq. 2)}$$

Normally, continuity consistency is computed for each seismic data point in the subsurface region of interest.

Calculation of Parallelism

By "parallelism" is meant the degree to which subsurface strata extend in parallel planes. A "dip" data trace, may be utilized for calculating parallelism. This dip data trace is generated in step 42 from the calculated values of dip of maximum semblance and the semblance magnitude for this dip for data points extending along a seismic data trace. In the "dip" data trace, each data point in the seismic data trace is replaced with dip direction of maximum semblance calculated in steps 32 and 34 for that data point.

In order to calculate a value for parallelism, a window centered on a selected data point along a "dip" data trace is selected and the variance in the dip direction (the "dip variance") is then computed within the window in step 44. The measure of parallelism is inversely related to the dip variance. Accordingly, the magnitude of parallelism may be computed in step 46 from the following relationship:

$$Parallelism(x,y,t)=1-Dip\ Variance(x,y,t) \quad \text{(Eq. 3)}$$

Detection of Thin Beds

Prior to estimating bed (strata) thinness, trace smoothing steps 48 and 50 may optionally be performed. To perform trace smoothing, after the dip direction of maximum semblance is determined for a data point, an average of the signal amplitude of the data points along the direction of maximum semblance in adjacent traces is calculated in step 48, and in step 50 each trace value is replaced with the average calculated in step 48, in order to provide smoothing. Typically, an average is taken over 3 to 7 traces, depending on the signal-to-noise ratio. Normally fewer traces will be utilized in calculating an average for data having a high signal-to-noise ratio than for data having a lower signal-to-noise ratio. Either the smoothed trace or the unsmoothed trace may be utilized for determining bed thinness, with the smoothed trace normally being used for data having a low signal to noise ratio.

In step 52, each seismic signal trace, either the smoothed trace or the unsmoothed trace, is converted with a Hilbert Transform to obtain real and imaginary components of the seismic trace. Optionally, the Hilbert transformation may be combined with band pass filtering, which may be standard Butterworth type band pass filtering, to improve computational stability.

To estimate bed thinness, the instantaneous phase of each Hilbert transformed seismic trace is calculated in step 54 as follows:

$$Ph(x, y, t) = \arctan\left[\frac{g(x, y, t)}{f(x, y, t)}\right], \quad \text{(Eq. 4)}$$

in which Ph(x,y,t) is the instantaneous phase, g(x,y,t) is the imaginary term and f(x,y,t) is the real term of the Hilbert Transform.

The instantaneous frequency, Freq(x,y,t), (the rate of change of phase over time) of the seismic trace is defined as follows:

$$Freq(x, y, t) = \frac{d[Ph(x, y, t)]}{d(t)} \quad \text{(Eq. 5)}$$

Since the phase function is multi-valued with $2\pi$ jumps, the instantaneous frequency is calculated in step 56 as the derivative of the arctan function, which avoids the $2\pi$ discontinuities:

$$\begin{aligned}Freq(x, y, t) &= \frac{d\arctan[g(x, y, t)/f(x, y, t)]}{d(t)} \\ &= \frac{[f(x, y, t)dg/dt - g(x, y, t)df/dt]}{[f^2(x, y, t) + g^2(x, y, t)]}\end{aligned} \quad \text{(Eq. 6)}$$

The instantaneous phase is the argument of the analytic signal. The instantaneous phase is independent of trace amplitude. Instantaneous phase represents the phase of the resultant vector of individual simple harmonic motions. While individual vectors may rotate in clockwise motion, their resultant vector may at some instances form a cardioid pattern and appear to turn in the opposite direction. This may be viewed as the effect of interference of closely arriving wavelets in the presence of thin beds. Because of these reversals, instantaneous frequency will have fluctuations.

After calculating the instantaneous frequency of a seismic trace, thereby generating a seismic trace of instantaneous frequency values, the presence of thin beds is estimated in step 58 by forming successive windows on the trace, calculating the average frequency within the window and then computing the difference between the instantaneous and time averaged frequencies. The measure of bed thinness may be expressed as:

$$Thin(x,y,t)=Freq(x,y,t)-AvFreq(x,y,t) \quad \text{(Eq. 7)}$$

where: Thin(x,y,t) represents the bed thinness,

Freq(x,y,t) represents the instantaneous frequency value; and

AvFreq(x,y,t) represents the average frequency within the window.

Calculation of Shaliness

A measure of predicted shaliness may then be calculated in step 60 for each data point by calculating a product (which may be a weighted product) of the absolute values of the thinness magnitude determined in step 58, the lateral continuity magnitude calculated in step 34, the continuity consistency magnitude determined in step 40, and the parallelism magnitude determined in step 46. Accordingly, shaliness may be expressed as:

Shaliness=(Parallelism)(LateralContinuity) (ContinuityConsistency)(Thinness) (Eq. 8)

Figure 3:
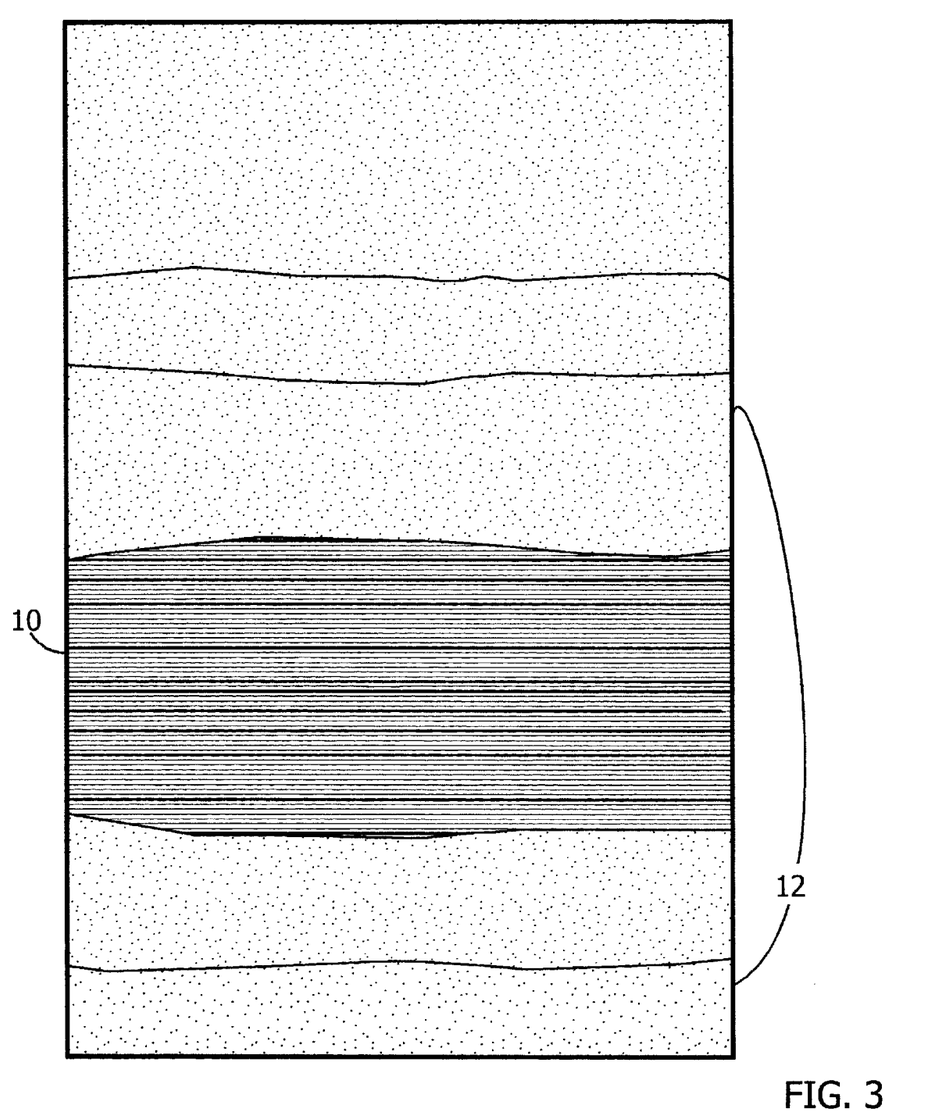
FIG. 3 is a display depicting a typical distribution of shaley and non-shaley regions of the earth's subsurface.

It is understood that the measure of shaliness, calculated as described above does not provide an absolute measurement of shaliness. However, locations in the subsurface for which the shaliness calculation produces a higher number are more likely to be shaley than subsurface locations for which the shaliness calculation produces a lower number. FIG. 3 shows a two dimensional plot of a region in the subsurface having shaliness calculations which are relatively high indicated as a shaley region 10, and other locations for which the shaliness calculations produced predominantly lower results indicated as regions 12. The process described above will assist a data analyst in identifying regions which are shaley from regions which are not, however, an analyst will normally combine the results of the present invention with other analysis to predict delineations of shaley subsurface regions.

Figure 4:
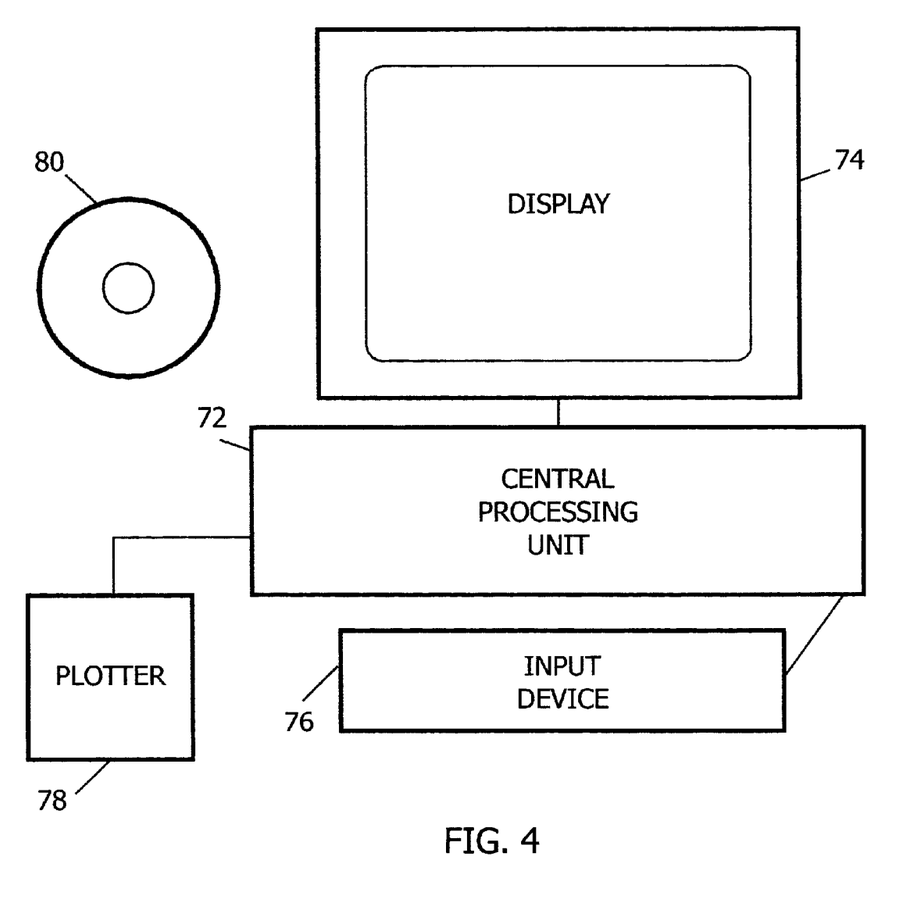
FIG. 4 illustrates apparatus for implementing the invention.

The process of the invention disclosed herein is most conveniently carried out by writing a computer program to carry out the steps described herein on a work station or other conventional digital computer system of a type normally used in the industry. The generation of such a program may be performed by those of ordinary skill in the art based on the processes described herein. FIG. 4 shows such a conventional computer system comprising a central processing unit 72, a display 74, an input device 76, and a plotter 78. The computer program for carrying out the invention will normally reside on a storage media (not shown) associated with the central processing unit. Such computer program may be transported on a CD-ROM or other storage media shown symbolically as storage media 80.

The results of the shaliness prediction calculation may be displayed with commercially available visualization software. Such software is well known to those of ordinary skill in the art and will not be further described herein. It should be appreciated that the results of the methods of the invention can be displayed, plotted, or both.

It will be appreciated that various modifications, alternatives, variations, and changes may be made without departing from the scope of the invention as defined in the appended claims. It is intended to cover by the appended claims all such modifications involved within the scope of the claims.

I claim:

1. A method of utilizing seismic data attributes for interpreting seismic data from a region of the earth's subsurface, comprising:

calculating values for a plurality of seismic data attributes of said seismic data; and generating combinations of calculated values for said plurality of seismic data attributes to generate an indication of shaliness of said region of the earth's subsurface;

wherein said seismic data attributes comprise at least one of the following: a seismic data attribute indicative of thinness of subsurface strata, a seismic data attribute indicative of parallelism of subsurface strata, a seismic data attribute indicative of lateral continuity of subsurface strata or a seismic data attribute indicative of continuity consistency of subsurface strata.

2. A method of utilizing seismic data attributes for interpreting seismic data from a region of the earth's subsurface, comprising:

calculating values for a plurality of seismic data attributes of said seismic data; and generating combinations of calculated values for said plurality of seismic data attributes to generate an indication of shaliness of said region of the earth's subsurface; and wherein said seismic data attributes comprise an attribute indicative of thinness of subsurface strata.

3. A method of utilizing seismic data attributes for interpreting seismic data from a region of the earth's subsurface, comprising:

calculating values for a plurality of seismic data attributes of said seismic data; and generating combinations of calculated values for said plurality of seismic data attributes to generate an indication of shaliness of said region of the earth's subsurface; and wherein said seismic data attributes comprise an attribute indicative of parallelism of subsurface strata.

4. A method of utilizing seismic data attributes for interpreting seismic data from a region of the earth's subsurface, comprising:

calculating values for a plurality of seismic data attributes of said seismic data; and generating combinations of calculated values for said plurality of seismic data attributes to generate an indication of shaliness of said region of the earth's subsurface; and wherein said seismic data attributes comprise an attribute indicative of lateral continuity of subsurface strata.

5. A method of utilizing seismic data attributes for interpreting seismic data from a region of the earth's subsurface, comprising:

calculating values for a plurality of seismic data attributes of said seismic data; and generating combinations of calculated values for said plurality of seismic data attributes to generate an indication of shaliness of said region of the earth's subsurface; and wherein said seismic data attributes comprise an attribute indicative of continuity consistency of subsurface strata.

6. A method of utilizing seismic data attributes for interpreting seismic data from a region of the earth's subsurface, comprising:.

calculating values for a plurality of seismic data attributes of said seismic data; and generating combinations of calculated values for said plurality of seismic data attributes to generate an indication of shaliness of said region of the earth's subsurface; and wherein said seismic data attributes comprise an attribute indicative of lateral continuity of subsurface strata, continuity consistency of subsurface strata, an attribute indicative of parallelism of subsurface strata, and an attribute indicative of thinness of subsurface strata.

7. A method of utilizing seismic data attributes for interpreting seismic data from a region of the earth's subsurface, comprising:

calculating values for a plurality of seismic data attributes of said seismic data; and generating combinations of calculated values for said plurality of seismic data attributes to generate an indication of shaliness of said region of the earth's subsurface; and wherein the combining of said values comprises multiplication of said values of said seismic data attributes.

8. A method of utilizing seismic data attributes for interpreting seismic data from a region of the earth's subsurface, comprising:

calculating values for a plurality of seismic data attributes of said seismic data;

generating combinations of calculated values for said plurality of seismic data attributes to generate an indication of shaliness of said region of the earth's subsurface; and generating a visual display of said indication of shaliness of said region of the earth's subsurface.

9. A method of utilizing seismic data attributes for interpreting seismic data from a region of the earth's subsurface, comprising:

calculating values for a seismic data attribute of said seismic data indicative of thinness of subsurface strata;

calculating values for a seismic data attribute of said seismic data indicative of parallelism of subsurface strata;

calculating values for a seismic data attribute of said seismic data indicative of lateral continuity of subsurface strata;

calculating values for a seismic data attribute of said seismic data indicative of continuity consistency of subsurface strata; and generating combinations of calculated values for said plurality of seismic data attributes to generate an indication of shaliness of said region of the earth's subsurface.

10. A method for processing seismic data traces from a region of the earth's subsurface to estimate shaliness of said region, comprising:

calculating semblance values for varying dip directions extending from selected data point of seismic data traces:

for said selected data points, selecting the maximum semblance value calculated and the dip direction having the maximum semblance value, said maximum semblance value being a measure of lateral continuity;

for said selected data points, calculating the continuation consistency magnitude;

for said selected data points, calculating the parallelism magnitude;

converting said seismic data traces with a Hilbert transform;

calculating the instantaneous phase of the Hilbert transformed seismic data traces;

calculating the instantaneous frequency of the Hilbert transformed seismic data traces from the calculated instantaneous phase;

calculating thinness of subsurface strata by comparing instantaneous frequency to the average frequency within selected windows of said transformed seismic data traces; and combining said calculations of lateral continuity, continuity consistency, parallelism and thinness to estimate shaliness in said region of the earth's subsurface.

11. A digital computer programmed to utilize seismic traces obtained over a region of the earth's subsurface to perform a process comprising the steps of:

(a) calculating values for a seismic data attribute of said seismic data indicative of thinness of subsurface strata;

(b) calculating values for a seismic data attribute of said seismic data indicative of parallelism of subsurface strata;

(c) calculating values for a seismic data attribute of said seismic data indicative of lateral continuity of subsurface strata;

(d) calculating values for a seismic data attribute of said seismic data indicative of continuity consistency of subsurface strata; and (e) generating combinations of calculated values for said plurality of seismic data attributes to generate an indication of shaliness of said region of the earth's subsurface.

12. A device which is readable by a digital computer having instruction defining the following process and instruction to the computer to perform said process:

(a) calculating values for a seismic data attribute of said seismic data indicative of thinness of subsurface strata;

(b) calculating values for a seismic data attribute of said seismic data indicative of parallelism of subsurface strata;

(c) calculating values for a seismic data attribute of said seismic data indicative of lateral continuity of subsurface strata;

(d) calculating values for a seismic data attribute of said seismic data indicative of continuity consistency of subsurface strata; and (e) generating combinations of calculated values for said plurality of seismic data attributes to generate an indication of shaliness of said region of the earth's subsurface.

13. The device of claim 12 wherein said device is selected from the group consisting of a magnetic tape, a magnetic disk, an optical disk and a CD-ROM.

* * * * *